United States Patent
Kokawa et al.

(10) Patent No.: US 11,404,213 B2
(45) Date of Patent: Aug. 2, 2022

(54) MULTILAYER CERAMIC CAPACITOR

(71) Applicant: Murata Manufacturing Co., Ltd., Nagaokakyo (JP)

(72) Inventors: Shinichi Kokawa, Nagaokakyo (JP); Yasuyuki Shimada, Nagaokakyo (JP); Naoto Muranishi, Nagaokakyo (JP); Takehisa Sasabayashi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 2 days.

(21) Appl. No.: 17/000,517

(22) Filed: Aug. 24, 2020

(65) Prior Publication Data

US 2021/0074482 A1    Mar. 11, 2021

(30) Foreign Application Priority Data

Sep. 5, 2019 (JP) .............................. JP2019-162185

(51) Int. Cl.
| | |
|---|---|
| *H01G 4/30* | (2006.01) |
| *H01G 4/008* | (2006.01) |
| *H01G 4/12* | (2006.01) |
| *H01G 4/248* | (2006.01) |

(52) U.S. Cl.
CPC .............. *H01G 4/30* (2013.01); *H01G 4/008* (2013.01); *H01G 4/1227* (2013.01); *H01G 4/248* (2013.01)

(58) Field of Classification Search
None
See application file for complete search history.

(56) References Cited

U.S. PATENT DOCUMENTS

| | | | | |
|---|---|---|---|---|
| 11,152,148 | B2* | 10/2021 | Takeda .................. | H01F 27/323 |
| 2006/0043523 | A1 | 3/2006 | Ito et al. | |
| 2006/0250747 | A1* | 11/2006 | Takashima ............. | H01G 4/232 |
| | | | | 361/272 |
| 2012/0019982 | A1* | 1/2012 | Sasaki ...................... | H01G 4/30 |
| | | | | 361/321.1 |
| 2012/0307417 | A1* | 12/2012 | Kim ....................... | H01G 4/012 |
| | | | | 361/321.2 |
| 2015/0116902 | A1* | 4/2015 | Sakai ..................... | H01G 4/012 |
| | | | | 361/301.4 |

(Continued)

FOREIGN PATENT DOCUMENTS

JP          2006-073623 A      3/2006

*Primary Examiner* — Dion R. Ferguson
(74) *Attorney, Agent, or Firm* — Keating & Bennett, LLP

(57) ABSTRACT

A multilayer ceramic capacitor includes a multilayer body including dielectric layers and layered internal electrodes, first and second main surfaces, first and second side surfaces, first and second end surfaces, and an external electrode connected to the internal electrodes and provided on each of the first and second end surfaces. A region where the internal electrodes are superimposed is defined as an effective region, regions respectively located on sides of the first and second end surfaces relative to the effective region are defined as first and second regions, and a bent portion where the dielectric layers and the internal electrodes are bent is located in the first region. In the bent portion, all vertices in the stacking direction are located within a range that extends by about 25 μm to about 35 μm in a length direction from the effective region of the multilayer body.

13 Claims, 7 Drawing Sheets

(56) References Cited

U.S. PATENT DOCUMENTS

| | | | |
|---|---|---|---|
| 2015/0340155 A1* | 11/2015 | Fukunaga | H01G 4/012 361/301.4 |
| 2016/0233024 A1* | 8/2016 | Kim | H01G 4/012 |
| 2017/0154733 A1* | 6/2017 | Lee | H01G 4/012 |
| 2017/0243695 A1* | 8/2017 | Kim | H01G 4/30 |
| 2020/0058443 A1* | 2/2020 | Kang | H01G 4/248 |
| 2020/0152385 A1* | 5/2020 | Ishizuka | H01G 4/30 |
| 2020/0152388 A1* | 5/2020 | Jun | H01G 4/248 |
| 2020/0312568 A1* | 10/2020 | Harada | H01G 4/012 |
| 2021/0027942 A1* | 1/2021 | Kim | H01G 4/232 |
| 2021/0074482 A1* | 3/2021 | Kokawa | H01G 4/008 |
| 2021/0104364 A1* | 4/2021 | Okuda | H01G 4/008 |
| 2021/0166874 A1* | 6/2021 | Tanaka | H01G 4/012 |
| 2021/0210285 A1* | 7/2021 | Sasabayashi | H01G 4/1227 |
| 2021/0287853 A1* | 9/2021 | Sasabayashi | H01G 4/008 |
| 2021/0287854 A1* | 9/2021 | Sasabayashi | H01G 4/1227 |

\* cited by examiner

MULTILAYER CERAMIC CAPACITOR

CROSS REFERENCE TO RELATED APPLICATIONS

This application claims the benefit of priority to Japanese Patent Application No. 2019-162185 filed on Sep. 5, 2019. The entire contents of this application are hereby incorporated herein by reference.

BACKGROUND OF THE INVENTION

1. Field of the Invention

The present invention relates to a multilayer ceramic capacitor.

2. Description of the Related Art

A multilayer ceramic capacitor that includes, on each of opposing end surfaces of a multilayer body which is a multilayer body including a plurality of layered dielectric layers and a plurality of layered internal electrodes, an external electrode disposed to conduct to the internal electrodes has conventionally been known.

Japanese Patent Laid-Open No. 2006-73623 describes a multilayer ceramic capacitor including such a structure. The multilayer ceramic capacitor includes an element body including dielectric layers and internal electrode layers that are alternately stacked, wherein a hetero phase is provided in the dielectric layers and/or the internal electrode layers and the hetero phase includes a Mg element and a Mn element. According to Japanese Patent Laid-Open No. 2006-73623, with the structure described above, a multilayer ceramic capacitor having low IR temperature dependency and a reliable average lifetime can be obtained.

With the structure of the multilayer ceramic capacitor described in Japanese Patent Laid-Open No. 2006-73623, the internal electrode layer has a smaller two-dimensional area than the dielectric layer and an internal electrode may be bent due to a height difference between a peripheral portion of the internal electrode layer and the dielectric layer, and short-circuiting may occur.

SUMMARY OF THE INVENTION

Preferred embodiments of the present invention provide multilayer ceramic capacitors that are each able to reduce or prevent the occurrence of short-circuiting.

A multilayer ceramic capacitor according to a preferred embodiment of the present invention includes a multilayer body including a plurality of layered dielectric layers and a plurality of layered internal electrodes, the multilayer body including a first main surface and a second main surface opposed to each other in a stacking direction of the dielectric layers and the internal electrodes, a first side surface and a second side surface opposed to each other in a width direction orthogonal or substantially orthogonal to the stacking direction, and a first end surface and a second end surface opposed to each other in a length direction orthogonal or substantially orthogonal to the stacking direction and the width direction, and an external electrode electrically connected to the internal electrodes and provided on each of the first end surface and the second end surface of the multilayer body. With a region where the internal electrodes are superimposed on one another being defined as an effective region, with a region located on a side of the first end surface relative to the effective region being defined as a first region, and with a region located on a side of the second end surface relative to the effective region being defined as a second region when the multilayer body is viewed in the stacking direction, a bent portion where the dielectric layers and the internal electrodes are bent in the stacking direction is located in the first region among the effective region, the first region, and the second region. In the bent portion, all vertices in the stacking direction of a plurality of bent dielectric layers and a plurality of bent internal electrodes are located within a range that extends by not smaller than about 25 μm and not larger than about 35 μm in the length direction from the effective region of the multilayer body.

The bent portion may be located on an inner side in the length direction relative to a position at a distance of about 0.3× L1 from the first end surface, where L1 represents a dimension in the length direction of the first region.

The external electrode may include a first Ni layer provided on each of the first end surface and the second end surface, a second Ni layer provided on the first Ni layer, and an Sn layer provided on the second Ni layer.

The first Ni layer may be an underlying electrode layer and the second Ni layer and the Sn layer may be plated layers. In a cross-section defined by the length direction and the stacking direction at a central position in the width direction of the first Ni layer, the first Ni layer may contain at least about 25 area % and at most about 40 area % of a dielectric composition within a range of about 6 μm× about 8 μm at a central position in the stacking direction and in the length direction.

The internal electrode may have a thickness not larger than about 0.40 μm.

The internal electrode may have a thickness not larger than about 0.35 μm.

The dielectric layer may have a thickness not larger than about 0.55 μm.

With the multilayer ceramic capacitors according to preferred embodiments of the present invention, a bent portion where the dielectric layers and the internal electrodes are bent in the stacking direction is located in the first region located on the side of the first end surface relative to the effective region where the internal electrodes are superimposed on one another in the stacking direction and no bent portion is located in the effective region where a distance between the internal electrodes adjacent in the stacking direction is short. Therefore, the occurrence of short-circuiting is able to be reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described below with reference to the drawings.

Figure 1:
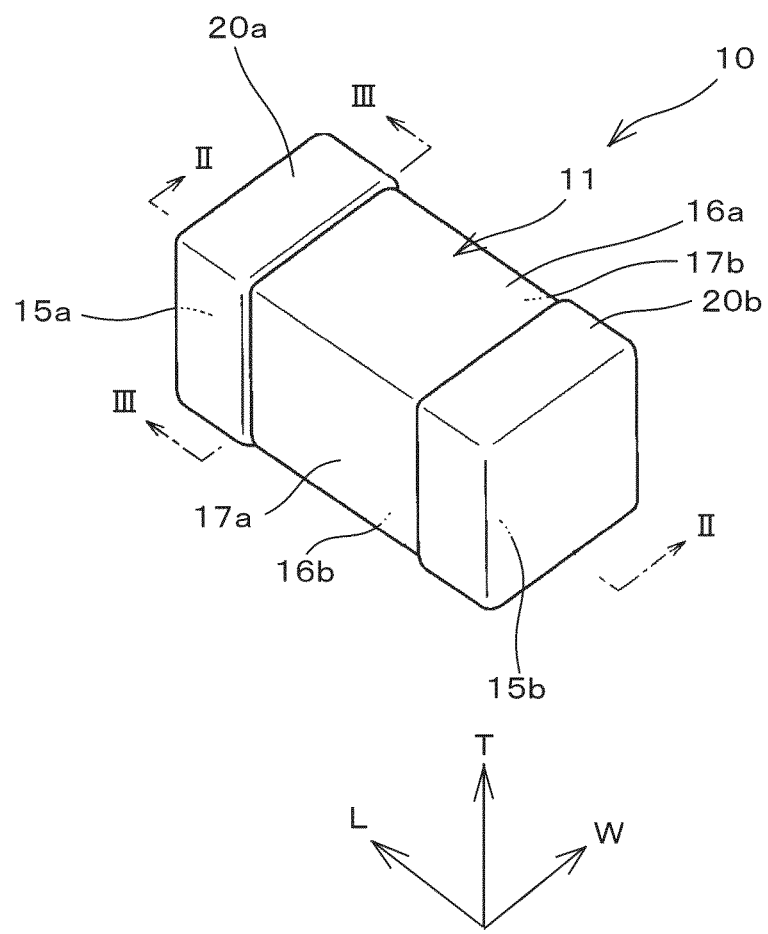
FIG. 1 is a perspective view of a multilayer ceramic capacitor according to a preferred embodiment of the present invention.
Figure 2:
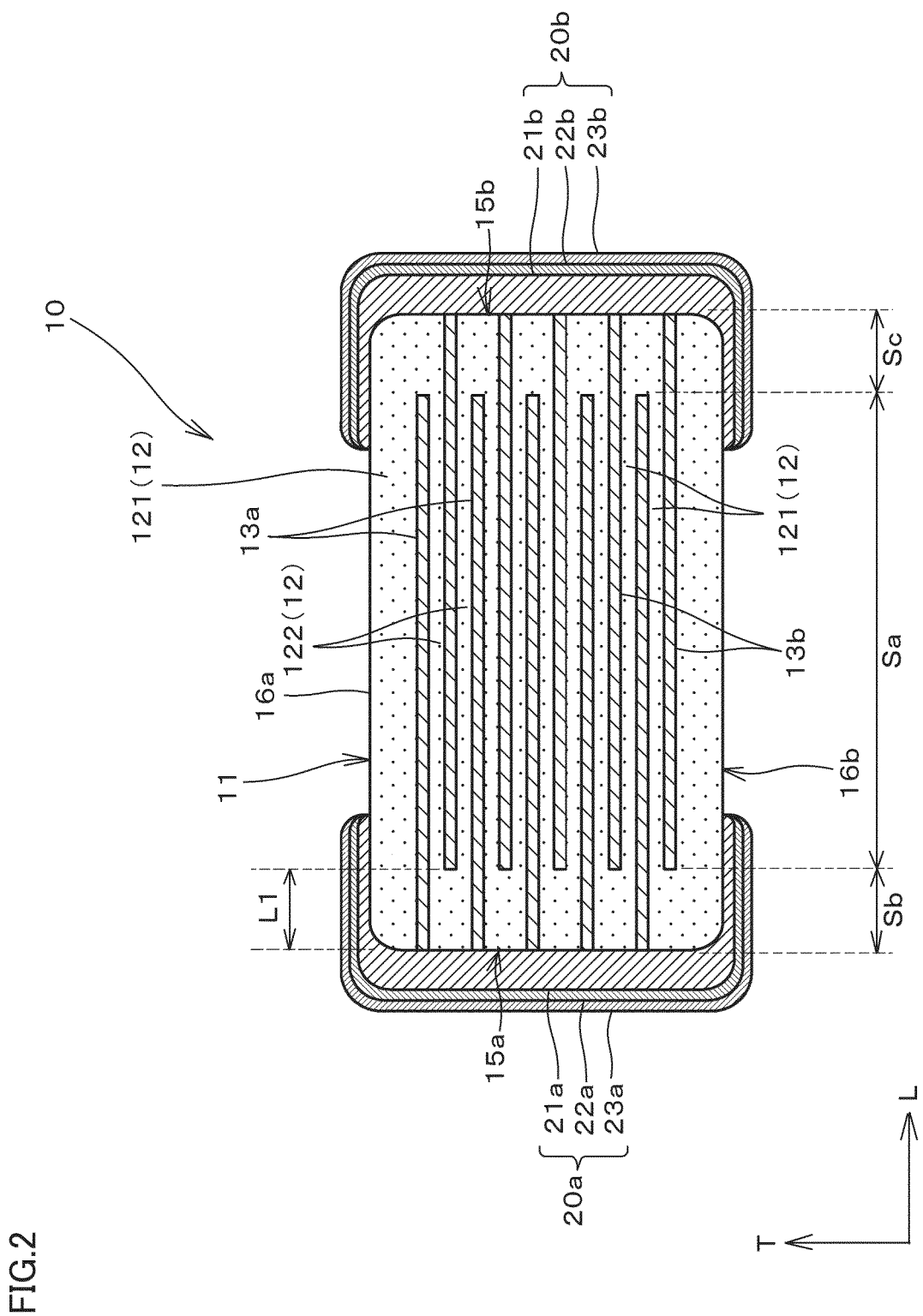
FIG. 2 is a cross-sectional view along the line II-II of the multilayer ceramic capacitor shown in FIG. 1.
Figure 3:
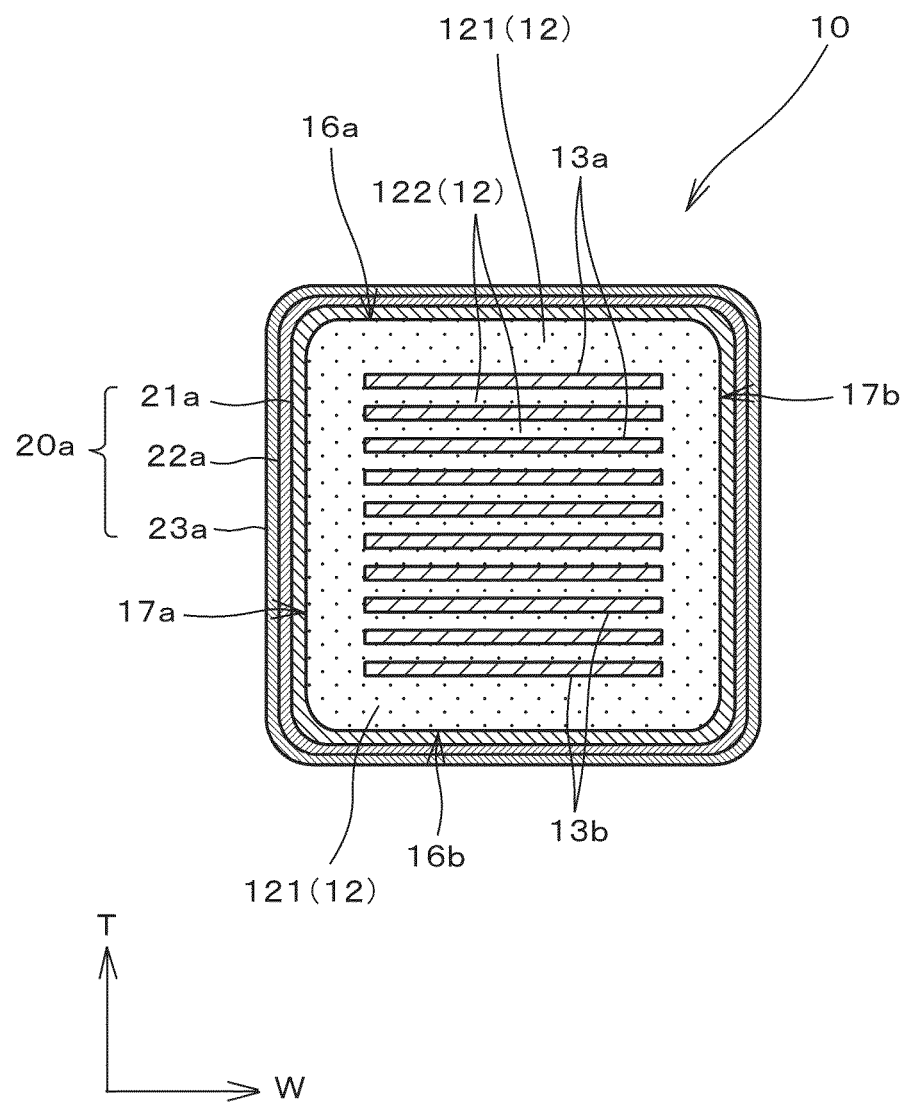
FIG. 3 is a cross-sectional view along the line of the multilayer ceramic capacitor shown in FIG. 1.

FIG. 1 is a perspective view of a multilayer ceramic capacitor 10 according to a preferred embodiment of the present invention. FIG. 2 is a cross-sectional view along the line II-II of multilayer ceramic capacitor 10 shown in FIG. 1. FIG. 3 is a cross-sectional view along the line III-III of multilayer ceramic capacitor 10 shown in FIG. 1.

As shown in FIGS. 1 to 3, multilayer ceramic capacitor 10 is an electronic component having a parallelepiped shape, and includes a multilayer body 11 and a pair of external electrodes 20a and 20b. External electrodes 20a and 20b are opposed to each other as shown in FIG. 1.

A direction in which external electrodes 20a and 20b are opposed to each other is defined as a length direction L of multilayer ceramic capacitor 10, a direction in which dielectric layers 12 and internal electrodes 13a and 13b which will be described later are layered is defined as a stacking direction T, and a direction orthogonal or substantially orthogonal to both of length direction L and stacking direction T is defined as a width direction W.

Multilayer body 11 includes a first end surface 15a and a second end surface 15b opposed to each other in length direction L, a first main surface 16a and a second main surface 16b opposed to each other in stacking direction T, and a first side surface 17a and a second side surface 17b opposed to each other in width direction W.

First external electrode 20a is provided on first end surface 15a and second external electrode 20b is provided on second end surface 15b.

Multilayer body 11 preferably includes a corner and a ridgeline that are rounded. The corner refers to a portion where three surfaces of multilayer body 11 meet one another and the ridgeline refers to a portion where two surfaces of multilayer body 11 meet each other.

As shown in FIGS. 2 and 3, multilayer body 11 includes a plurality of layered dielectric layers 12 and a plurality of layered internal electrodes 13a and 13b. Internal electrodes 13a and 13b include first internal electrodes 13a and second internal electrodes 13b. More specifically, multilayer body 11 includes a structure in which first internal electrodes 13a and second internal electrodes 13b are alternately layered in stacking direction T with dielectric layers 12 interposed therebetween.

As shown in FIGS. 2 and 3, dielectric layer 12 includes an outer dielectric layer 121 located on an outer side in stacking direction T relative to internal electrode 13a or 13b located on an outermost side in stacking direction T and an inner dielectric layer 122 located between two internal electrodes 13a and 13b adjacent in stacking direction T.

More specifically, outer dielectric layer 121 is located between internal electrode 13a or 13b located on the outermost side in stacking direction T and first main surface 16a or second main surface 16b of multilayer body 11. Inner dielectric layer 122 is located between first internal electrode 13a and second internal electrode 13b adjacent in stacking direction T.

Dielectric layer 12 is preferably made of, for example, a ceramic material mainly including $BaTiO_3$.

First internal electrode 13a extends to first end surface 15a of multilayer body 11. Second internal electrode 13b extends to second end surface 15b of multilayer body 11.

First internal electrode 13a includes an opposing electrode portion which is opposed to second internal electrode 13b and a drawn electrode portion which extends from the opposing electrode portion to first end surface 15a of multilayer body 11. Second internal electrode 13b includes an opposing electrode portion which is opposed to first internal electrode 13a and a drawn electrode portion which extends from the opposing electrode portion to second end surface 15b of multilayer body 11.

As the opposing electrode portion of first internal electrode 13a and the opposing electrode portion of second internal electrode 13b are opposed to each other with dielectric layer 12 being interposed, a capacitance is generated and thus a function as a capacitor is performed.

First internal electrode 13a and second internal electrode 13b preferably contain, for example, a metal such as Ni, Cu, Ag, Pd, and Au or an alloy of Ag and Pd. First internal electrode 13a and second internal electrode 13b may further contain dielectric particles based on a composition the same as or similar to the composition of ceramics contained in dielectric layer 12.

When multilayer body 11 is viewed in stacking direction T, a region where first internal electrodes 13a and opposing second internal electrodes 13b are superimposed on one another is an effective region Sa, a region located on a side of first end surface 15a relative to effective region Sa is a first region Sb, and a region located on a side of second end surface 15b relative to effective region Sa is a second region Sc (see FIG. 2).

Only in first region Sb among effective region Sa, first region Sb, and second region Sc of multilayer body 11, a bent portion 30 where dielectric layers 12 and first internal electrodes 13a are bent in stacking direction T is provided.

Multilayer ceramic capacitor 10 has line symmetry with respect to length direction L. Therefore, even though bent portion 30 appears to be located only in second region Sc as shown in FIG. 2, bent portion 30 is located only in first region Sb if multilayer ceramic capacitor 10 is horizontally turned 180°.

Figure 4:
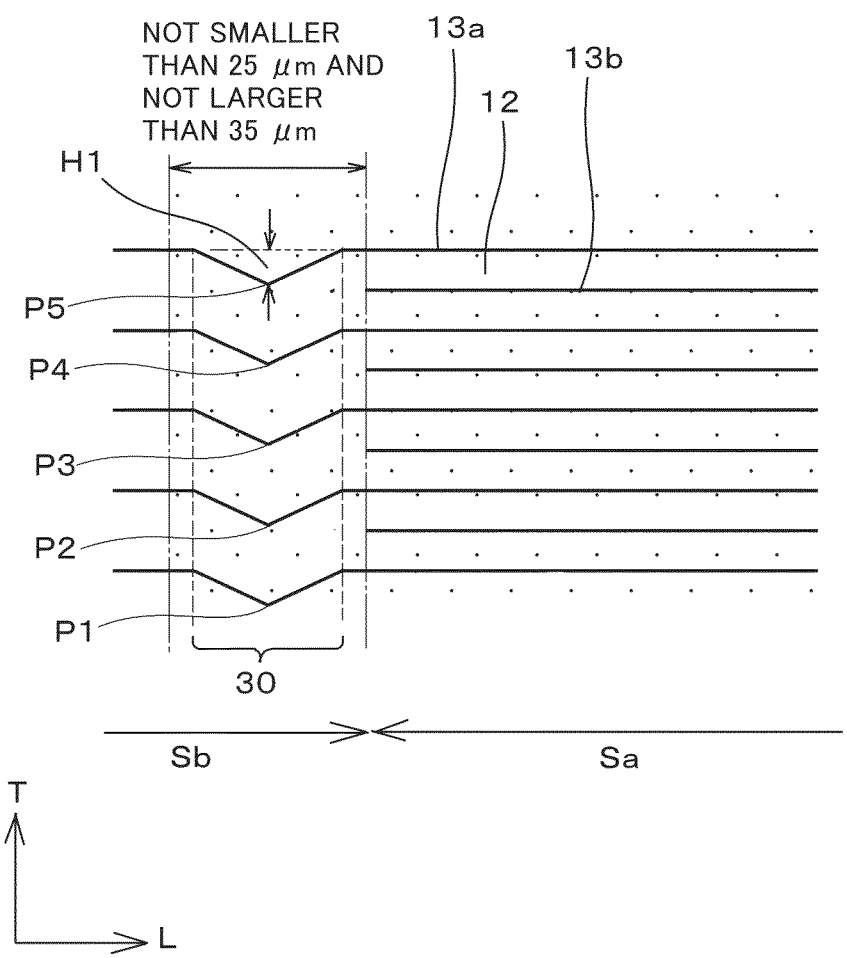
FIG. 4 is a diagram schematically showing an exemplary shape of a bent portion.

FIG. 4 is a diagram schematically showing an exemplary shape of bent portion 30. A direction of bending in bent portion 30 may be a direction toward first main surface 16a or toward second main surface 16b in stacking direction T. FIG. 4 shows an example in which the direction of bending is toward second main surface 16b.

Bent portion 30 is defined as below. Initially, multilayer body 11 is polished in a central portion in width direction W to expose internal electrodes 13a and 13b, and an image of internal electrodes 13a and 13b is observed by an optical microscope. A direction in which first main surface 16a extends is defined as an X axis and a direction perpendicular or substantially perpendicular to the X axis is defined as a Y axis. A line segment defined by the internal electrode on the X axis and the Y axis is regarded as a graph of a quadric and differentiated. A point closest to effective region Sa among points at which a sign of a derivative value changes is defined as bent portion 30.

As shown in FIG. 4, in bent portion 30, vertices in stacking direction T of a plurality of bent dielectric layers 12 and vertices P1 to P5 in stacking direction T of first internal electrodes 13a are all located within a range that extends, for example, by not smaller than about 25 μm and not larger than about 35 μm in length direction L from effective region Sa of multilayer body 11. Vertices P1 to P5 are all preferably located within a range that extends, for example, by not smaller than about 15 μm and not larger than about 45 μm in length direction L from effective region Sa of multilayer body 11.

Bent portion 30 is preferably located on an inner side in length direction L relative to a position at a distance of about 0.3× L1, for example, from first end surface 15a, where L1 represents a dimension in the length direction of first region Sb. The inner side in length direction L refers to the inner side when the side of first end surface 15a is defined as an outer side.

In effective region Sa, first internal electrode 13a and second internal electrode 13b are superimposed on each other in stacking direction T and, thus, a distance between two internal electrodes 13a and 13b adjacent in stacking direction T is short. Therefore, when bent portion 30 is located in effective region Sa, adjacent internal electrodes 13a and 13b may come into contact with each other and short-circuiting may occur.

In multilayer ceramic capacitor 10 according to the present preferred embodiment, however, bent portion 30 is located only in first region Sb where no second internal electrode 13b is located, and no bent portion 30 is located in effective region Sa. Therefore, the occurrence of short-circuiting can be reduced or prevented.

In multilayer ceramic capacitor 10 according to the present preferred embodiment, a height difference between a peripheral portion of internal electrode 13a or 13b and dielectric layer 12 is reduced or prevented as compared with a conventional multilayer ceramic capacitor as will be described in detail in a manufacturing method which will be described later. Therefore, bending of the internal electrode at a portion where a height difference is caused can be reduced or prevented and the occurrence of short-circuiting can be reduced or prevented.

First external electrode 20a is provided on first end surface 15a of multilayer body 11. In the present preferred embodiment, first external electrode 20a is provided on the entire or substantially the entire first end surface 15a of multilayer body 11 and extends from first end surface 15a to first main surface 16a, second main surface 16b, first side surface 17a, and second side surface 17b. First external electrode 20a is electrically connected to first internal electrodes 13a.

Second external electrode 20b is provided on second end surface 15b of multilayer body 11. In the present preferred embodiment, second external electrode 20b is provided on the entire or substantially the entire second end surface 15b of multilayer body 11 and extends from second end surface 15b to first main surface 16a, second main surface 16b, first side surface 17a, and second side surface 17b. Second external electrode 20b is electrically connected to second internal electrodes 13b.

First external electrode 20a preferably includes, for example, a first Ni layer 21a provided on first end surface 15a of multilayer body 11, a second Ni layer 22a provided on first Ni layer 21a, and an Sn layer 23a provided on second Ni layer 22a.

Second external electrode 20b preferably includes, for example, a first Ni layer 21b provided on second end surface 15b of multilayer body 11, a second Ni layer 22b provided on first Ni layer 21b, and an Sn layer 23b provided on second Ni layer 22b.

First Ni layers 21a and 21b are each an underlying electrode layer, and for example, a baked electrode layer formed by applying a conductive paste containing Ni to the multilayer body and baking the conductive paste. First Ni layers 21a and 21b contain a dielectric composition as a common material. The dielectric composition is preferably made of, for example, a ceramic material the same as or similar to a material for dielectric layer 12. Although a material for the dielectric composition does not have to be a ceramic material exactly the same as that for dielectric layer 12, a material close in component to the ceramic material for dielectric layer 12 is preferably used.

In multilayer ceramic capacitor 10 according to the present preferred embodiment, in a cross-section defined by length direction L and stacking direction T at a central position in width direction W of first Ni layers 21a and 21b, first Ni layers 21a and 21b each preferably contain, for example, at least about 25 area % and at most about 40 area % of a dielectric composition within a range of about 6 μm× about 8 μm at a central position in stacking direction T and in length direction L. As first Ni layers 21a and 21b preferably contain at least about 25 area % and at most about 40 area % of the dielectric composition, connectivity between first Ni layer 21a or 21b and multilayer body 11 can be improved and peel-off of first external electrode 20a and second external electrode 20b can be reduced or prevented.

The area ratio of the dielectric composition contained in first Ni layers 21a and 21b can be measured by a method described below with the use of a wavelength dispersive X-ray analyzer (which is called WDX below).

Initially, a cross-section defined by length direction L and stacking direction T is exposed at the central position in width direction W of multilayer ceramic capacitor 10, and the central position in stacking direction T and in length direction L of multilayer body 11 is magnified at 10000×. A field of view of a magnified region is set to about 6 μm× about 8 μm, for example. The magnified region is mapped by using WDX and an area ratio is measured based on an image obtained by mapping.

Second Ni layers 22a and 22b and Sn layers 23a and 23b are preferably plated layers.

Each portion of multilayer ceramic capacitor 10 preferably has dimensions, for example, as below.

Dimension in length direction L: about 0.6±0.09 mm
Dimension in width direction W: about 0.3±0.09 mm or less
Dimension in stacking direction T: about 0.3±0.09 mm or less
Thickness of dielectric layer: not smaller than about 0.50 μm and not larger than about 0.60 μm, and more preferably not larger than about 0.55 μm
Thickness of internal electrode: not smaller than about 0.25 μm and not larger than about 0.40 μm, and more preferably not larger than about 0.35 μm In multilayer ceramic capacitor 10 according to the present preferred embodiment, internal electrodes 13a and 13b each preferably have a thickness in stacking direction T preferably not larger than about 0.40 μm, and more preferably not larger than about 0.35 μm, for example.

Dielectric layer 12 has a thickness in stacking direction T preferably not larger than about 0.55 μm, for example.

The thickness of dielectric layer 12 and the thickness of each of first internal electrode 13a and second internal electrode 13b can be measured by a method below.

Figure 5:
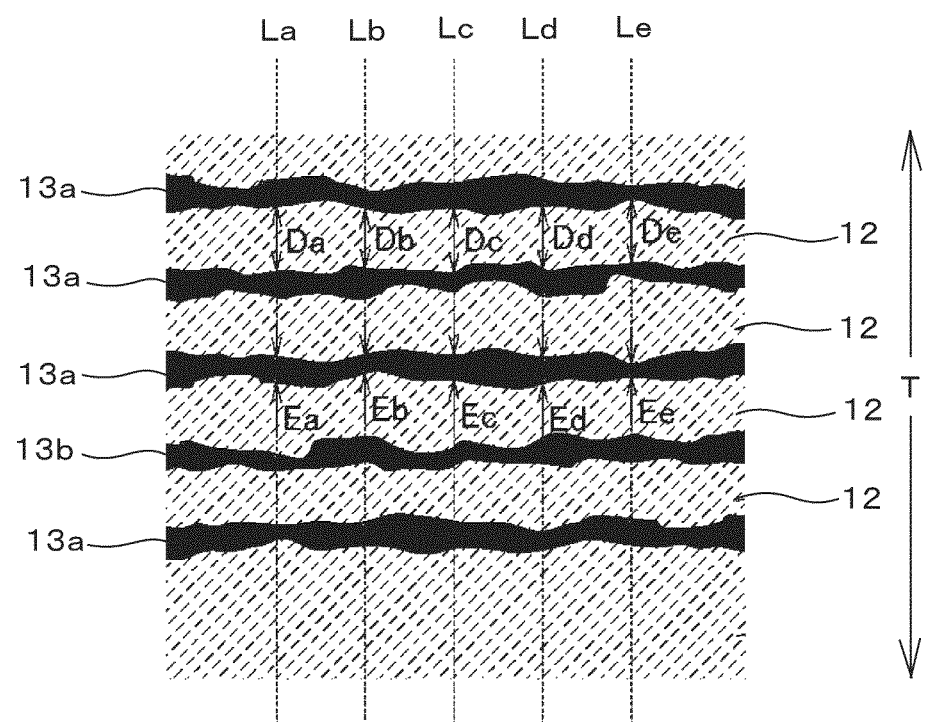
FIG. 5 is a diagram schematically showing a cross-section of a multilayer body observed with a scanning electron microscope.

Initially, a surface of multilayer body 11 defined by stacking direction T and width direction W, that is, a surface orthogonal or substantially orthogonal to length direction L of multilayer body 11, is polished to expose a cross-section, and the cross-section is observed with a scanning electron microscope. FIG. 5 is a diagram schematically showing a cross-section of multilayer body 11 observed with a scanning electron microscope.

Then, thicknesses Dc, Da, Db, Dd, and De of dielectric layer 12 along five lines in total of a centerline Lc along stacking direction T that passes through the center or approximate center of the exposed cross-section and lines La, Lb, Ld, and Le equidistantly drawn on opposing sides of centerline Lc, with two lines being drawn on each side, are measured, and an average of the thicknesses is defined as the thickness of dielectric layer 12.

Similarly, a thickness Ea along line La, a thickness Eb along line Lb, a thickness Ec along line Lc, a thickness Ed along line Ld, and a thickness Ee along line Le are measured and an average thereof is defined as the thickness of first internal electrode 13a. A thickness of second internal electrode 13b can also be found by a similar method.

For example, in calculating an average thickness of a plurality of dielectric layers 12, thicknesses of five dielectric layers in total including dielectric layer 12 located substantially in the center in stacking direction T and two dielectric layers 12 located on each of opposing sides thereof are measured by the method above, and an average thereof is defined as an average thickness of the plurality of dielectric layers 12. When the number of dielectric layers 12 is smaller than five, thicknesses of all dielectric layers 12 are measured by the method and the average thereof is defined as an average thickness of the plurality of dielectric layers 12. An average thickness of the plurality of internal electrodes 13a and 13b can also be found by a similar method.

Method of Manufacturing Multilayer Ceramic Capacitor

An exemplary method of manufacturing multilayer ceramic capacitor 10 according to a preferred embodiment of the present invention described above will be described below.

Initially, a ceramic green sheet, a conductive paste for an internal electrode, and a conductive paste for an external electrode are prepared. A known material containing an organic binder and an organic solvent, for example, can be used for each of the ceramic green sheet and the conductive paste for the internal electrode.

Figure 6A:
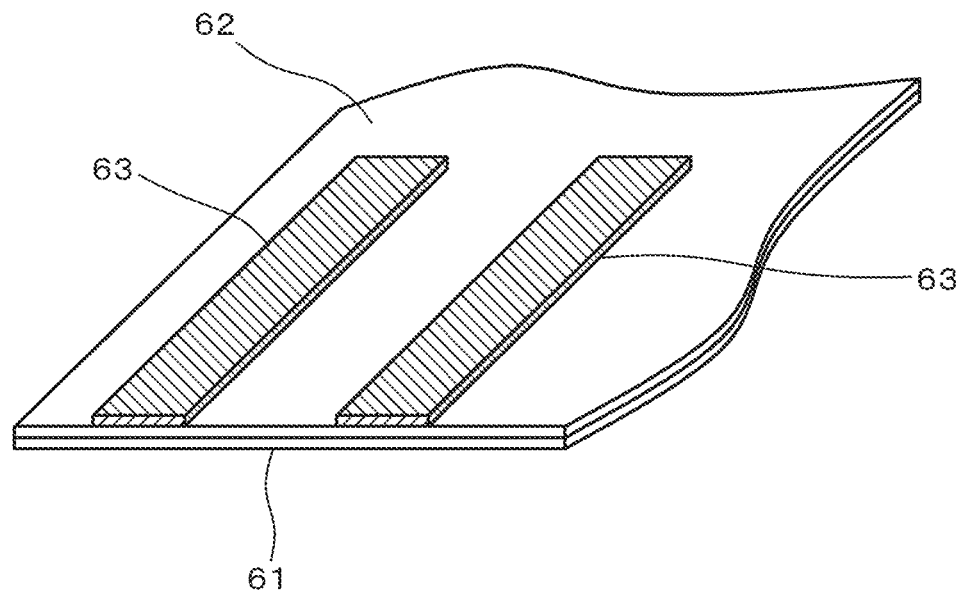
FIGS. 6A and 6B are diagrams for illustrating a method of manufacturing a multilayer ceramic capacitor according to a preferred embodiment of the present invention, FIG. 6A showing a state in which an internal electrode pattern is formed on a ceramic green sheet and FIG. 6B showing a state in which a ceramic paste pattern is formed in a peripheral region of the internal electrode pattern.

In succession, as shown in FIG. 6A, an internal electrode pattern 63 is formed by printing the conductive paste for the internal electrode on a ceramic green sheet 62 formed on a carrier film 61. For example, a printing method such as screen printing or gravure printing can be used for printing of the conductive paste for the internal electrode.

Figure 6B:
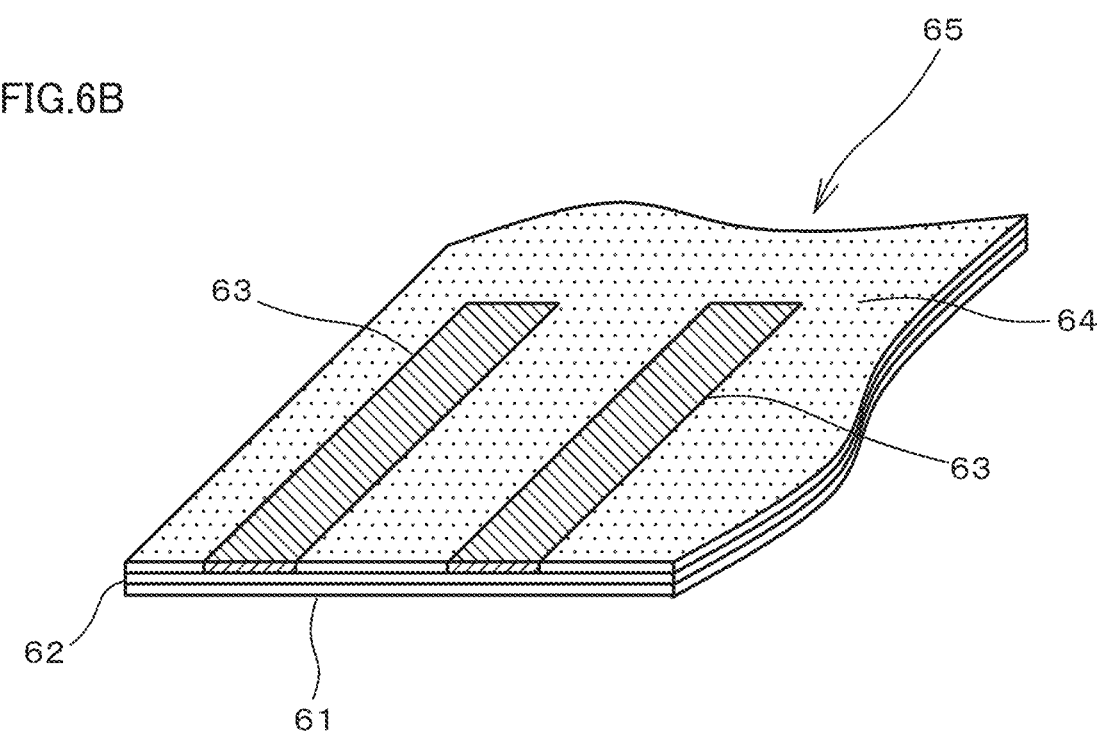

In succession, as shown in FIG. 6B, a ceramic paste pattern 64 for eliminating a height difference between internal electrode pattern 63 and a peripheral region thereof is formed by coating the peripheral region of internal electrode pattern 63 with a ceramic paste. A ceramic paste used in making ceramic green sheet 62 or a different ceramic paste may be used as the ceramic paste. A sheet 65 on which ceramic paste pattern 64 has been formed is called a zero-height-difference sheet.

Figure 7:
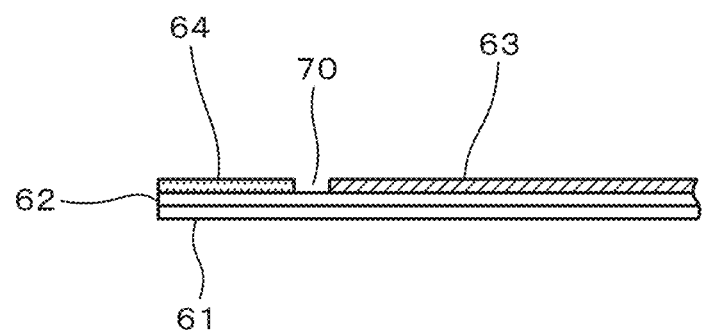
FIG. 7 is a diagram for illustrating a gap produced between the ceramic paste pattern and the internal electrode pattern.

In coating with the ceramic paste, it is difficult to accurately provide the coating so as not to produce a gap between internal electrode pattern 63 and ceramic paste pattern 64, and a gap 70 is produced as shown in FIG. 7. Bent portion 30 described above is assumed to be formed due to this gap 70 in a step of pressing the multilayer body which will be described later.

In succession, a mother multilayer body is made by layering a prescribed number of ceramic green sheets on which no internal electrode pattern 63 has been formed, successively layering zero-height-difference sheets 65 thereon, and layering thereon a prescribed number of ceramic green sheets on which no internal electrode pattern 63 has been formed. Zero-height-difference sheets 65 are layered with their positions being displaced such that first internal electrode 13a extends to first end surface 15a and second internal electrode 13b extends to second end surface 15b in completed multilayer ceramic capacitor 10.

In succession, a layered chip is obtained by pressing the mother multilayer body in the stacking direction by, for example, a method such as rigid body pressing or isostatic pressing and thereafter cutting the mother multilayer body into a prescribed size with such a cutting method as cutting by pressing, dicing, or laser. Thereafter, the corner and the ridgeline of the layered chip may be rounded by barrel polishing, for example.

In succession, the conductive paste for the external electrode is applied to the end surfaces of the layered chip, a portion of the main surfaces, and a portion of the side surfaces. The conductive paste for the external electrode preferably contains, for example, Ni powders and an organic solvent.

Thereafter, the layered chip is dried and thereafter fired. A temperature for firing is preferably, for example, not lower than about 900° C. and not higher than about 1300° C., although it is dependent on a ceramic material or a material for the conductive paste that is used. The multilayer body and a metal layer of the external electrode are thus formed.

Finally, a plated layer is formed on a surface of the metal layer. For example, an Ni plated layer is preferably formed first and thereafter an Sn plated layer is preferably formed.

Multilayer ceramic capacitor 10 can be manufactured through the process described above.

The present invention is not limited to the preferred embodiments described above, and includes various applications and modifications within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of layered dielectric layers and a plurality of layered internal electrodes, the multilayer body including a first main surface and a second main surface opposed to each other in a stacking direction of the dielectric layers and the internal electrodes, a first side surface and a second side surface opposed to each other in a width direction orthogonal or substantially orthogonal to the stacking direction, and a first end surface and a second end surface opposed to each other in a length direction orthogonal or substantially orthogonal to the stacking direction and the width direction; and
   an external electrode electrically connected to the internal electrodes and provided on each of the first end surface and the second end surface of the multilayer body;
   wherein a region where the internal electrodes are superimposed on one another is defined as an effective region, a region located on a side of the first end surface relative to the effective region is defined as a first region, a region located on a side of the second end surface relative to the effective region is defined as a second region when the multilayer body is viewed in the stacking direction, and a bent portion where the dielectric layers and the internal electrodes are bent in the stacking direction is located in the first region; and in the bent portion, all vertices in the stacking direction of a plurality of bent dielectric layers and a plurality of bent internal electrodes are located within a range that extends by not smaller than about 25 μm and not larger than about 35 μm in the length direction from the effective region of the multilayer body.

2. The multilayer ceramic capacitor according to claim 1, wherein the bent portion is located on an inner side in the length direction relative to a position at a distance of about 0.3× L1 from the first end surface, where L1 represents a dimension in the length direction of the first region.

3. The multilayer ceramic capacitor according to claim 1, wherein the external electrode includes:
   a first Ni layer on each of the first end surface and the second end surface;
   a second Ni layer on the first Ni layer; and
   an Sn layer provided on the second Ni layer.

4. The multilayer ceramic capacitor according to claim 3, wherein
   the first Ni layer is an underlying electrode layer and the second Ni layer and the Sn layer are plated layers; and
   in a cross-section defined by the length direction and the stacking direction at a central position in the width direction of the first Ni layer, the first Ni layer contains at least about 25 area % and at most about 40 area % of a dielectric composition within a range of about 6 μm× about 8 μm at a central position in the stacking direction and in the length direction.

5. The multilayer ceramic capacitor according to claim 1, wherein the internal electrode has a thickness not larger than about 0.40 μm.

6. The multilayer ceramic capacitor according to claim 5, wherein the internal electrode has a thickness not larger than about 0.35 μm.

7. The multilayer ceramic capacitor according to claim 1, wherein the dielectric layer has a thickness not larger than about 0.55 μm.

8. The multilayer ceramic capacitor according to claim 1, wherein the plurality of dielectric layers are made of a ceramic material mainly including $BaTiO_3$.

9. The multilayer ceramic capacitor according to claim 1, wherein the plurality of internal electrodes include at least one of Ni, Cu, Ag, Pd, and Au or an alloy of Ag and Pd.

10. The multilayer ceramic capacitor according to claim 9, wherein the plurality of internal electrodes further include dielectric particles made of a same or substantially a same composition of ceramics as that included in the plurality of dielectric layers.

11. The multilayer ceramic capacitor according to claim 4, wherein the first Ni layer includes a conductive paste including Ni.

12. The multilayer ceramic capacitor according to claim 11, wherein the first Ni layer includes a dielectric composition.

13. The multilayer ceramic capacitor according to claim 12, wherein the dielectric composition of the first Ni layer is a same or substantially a same material as that of the plurality of dielectric layers.

* * * * *